(12) United States Patent
Katoh

(10) Patent No.: US 7,495,269 B2
(45) Date of Patent: Feb. 24, 2009

(54) SEMICONDUCTOR DEVICE AND ELECTRONIC APPARATUS USING THE SAME

(75) Inventor: Tetsuya Katoh, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 731 days.

(21) Appl. No.: 11/204,099

(22) Filed: Aug. 16, 2005

(65) Prior Publication Data
US 2006/0038277 A1 Feb. 23, 2006

(30) Foreign Application Priority Data
Aug. 17, 2004 (JP) ............... 2004-236979

(51) Int. Cl.
H01L 29/96 (2006.01)
H01L 27/04 (2006.01)
(52) U.S. Cl. ..................... 257/203; 327/565
(58) Field of Classification Search ............. 257/203; 327/565; 307/75, 97
See application file for complete search history.

(56) References Cited

U.S. PATENT DOCUMENTS 4,996,453 A * 2/1991 Zanders et al. ............. 326/81
2005/0276110 A1* 12/2005 Sakurai et al. ......... 365/185.18

FOREIGN PATENT DOCUMENTS

| JP | 9-74348 | 3/1997 |
|---|---|---|
| JP | 10-84274 | 3/1998 |
| JP | 2002-83872 | 3/2002 |
| JP | 3498090 | 12/2003 |
| JP | 2004-128590 | 4/2004 |

OTHER PUBLICATIONS http://www6.ibm.com/jp/chips/literature/pdf/CullASIC.pdf>, retrieved on Jun. 11, 2004, issued from Japan IBM Company.

* cited by examiner

Primary Examiner—Evan Pert
(74) Attorney, Agent, or Firm—McGinn IP Law Group, PLLC

(57) ABSTRACT

A semiconductor device contains a semiconductor chip, and includes first and second circuits, a control signal line and a terminal. The first circuit is arranged in a center of the semiconductor chip and is configured to operate at a first voltage. The second circuit is arranged in an input/output circuit area around the first circuit on the semiconductor chip, and is configured to operate at the first voltage and a second voltage and to transfer a signal between an external unit outside the semiconductor chip and the first circuit. The control signal line is provided for the input/output circuit area on the semiconductor chip. The terminal is connected with the control signal line and supplied with a control signal. The second circuit stops a transfer of the signal between the external unit and the first circuit in response to the control signal which is transferred on the control signal line.

20 Claims, 5 Drawing Sheets

Fig. 3
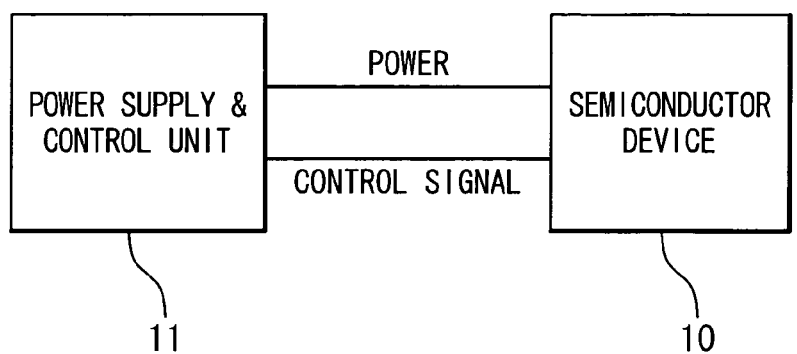
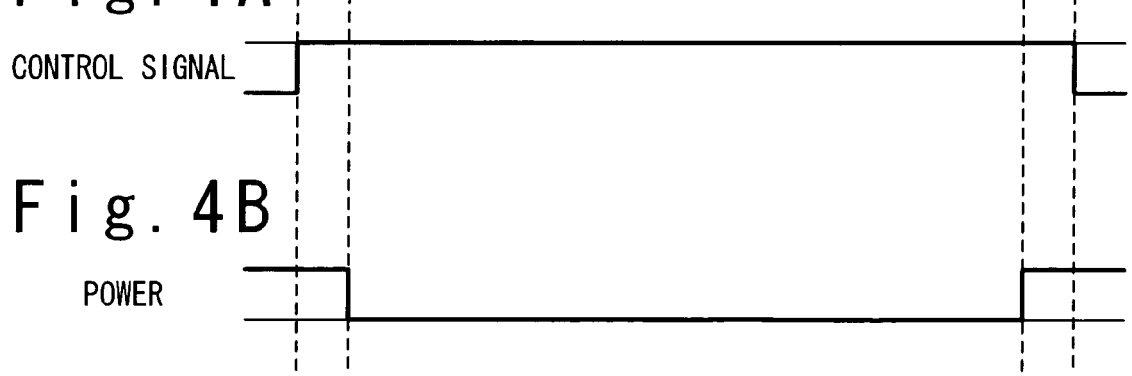

US 7,495,269 B2

SEMICONDUCTOR DEVICE AND ELECTRONIC APPARATUS USING THE SAME

BACKGROUND OF THE INVENTION

1. Field of the Invention

The present invention generally relates to a semiconductor device and an electronic apparatus using the semiconductor device.

2. Description of the Related Art

In electronic apparatuses such as portable telephones and portable terminals, attainment of a plurality of functions in a compact size is demanded. For this purpose, a technique of mounting a plurality of circuits for the plurality of functions using a plurality of power supply voltages on one chip has been developed, as described in, for example, Japanese Laid Open Patent Application (JP-P2002-83872A) and a leaflet issued from Japan IBM company, and retrieved on Jun. 11, 2004 through the Internet URL: http://www6.ibm.com/jp/chips/literature/pdf/CullASIC.pdf>

FIG. 1 is a plan view schematically showing a conventional semiconductor device 200 using power supply voltages. Referring now to FIG. 1, the conventional semiconductor device 200 contains an internal logic circuit 201 and an input/output circuit region 202. In the input/output circuit region 202 of this conventional semiconductor device 200, an outside region of a boundary indicated by a broken line is an external power supply region where a power supply is normally turned ON. Also, an inside region of the boundary indicated by the broken line is an internal power supply region. When the internal logic circuit 201 operates, the power supply is turned ON, whereas when the internal logic circuit 201 does not operate, the power supply is turned OFF. In the input/output circuit region 202, level shifters 211 and 213, buffers 212, 213, and 214 are arranged. The level shifter 211 level-shifts a signal from the internal logic circuit 201, and outputs the level-shifted signal to an external circuit via a terminal 223. The buffer 212 outputs a signal from the internal logic circuit 201 to the external unit via the terminal 223 without any level shift. The level shifter 213 level-shifts a signal supplied from the external circuit via the terminal 223 and transfers to the internal logic circuit 201. The buffer 214 outputs a signal supplied from the external circuit via the terminal 223 to the internal logic circuit 201 without any level shift. As described above, the internal logic circuit 201 outputs and receives the signals via the input/output circuit region 202 with respect to the external circuit.

In the above-described semiconductor device 200, when the internal logic circuit 201 is not used, the supply of the electric power to the internal logic circuit 201 is stopped, so that power consumption can be reduced. However, when the supply of the electric power to the internal logic circuit 201 is stopped, signals voltages become uncertain in the internal logic circuit 201. As a result, the below-mentioned troubles may occur. That is, a signal with an uncertain level is supplied from the internal logic circuit 201 to the level shifter 211. Therefore, a leak current flows. Also, a gate leak occurs in the buffer 214 which receives the signal from the external circuit. Because of these leak currents, even if the supply of the electric power to the internal logic circuit 201 is stopped, the power consumption is not reduced. Therefore, an effect when the supply of the electric power to the internal logic circuit 201 is stopped cannot be so much expected.

Japanese Laid Open Patent Application (JP-A-Heisei 10-84274) discloses a semiconductor logic circuit and a circuit layout structure in FIG. 11 of the application. In this conventional example, it is described in a paragraph number [0104] that a low-voltage power supply wiring line and a control wiring line (control terminal) for a power converter are previously provided in each of input cells, output cells, and other power supply cells, and wiring is completed only by arranging the cell. Also, it is described in a paragraph number [0102] that when a logic circuit is in a sleep state, a control circuit outputs a control signal to stop the supply of internal power from an external circuit outside a semiconductor device, for reduction of power consumption. Also, it is described that when the logic circuit is in an active state, the control circuit outputs another control signal to supply the internal power. Therefore, in this conventional example, the control circuit would contain any section for determining whether the logic circuit is in the sleep state or the active state, and control the supply of the internal power in accordance with the determination result.

In conjunction with the above description, a semiconductor device is disclosed in Japanese Laid Open Patent Application (JP-A-Heisei 9-74348). In the semiconductor device of this conventional example, a first inverter is connected between a first power supply terminal for a first voltage and a second power supply terminal for the ground potential. A boosting circuit is connected between a second power supply terminal for a third voltage and the second power supply terminal, and operates based upon an input signal and output signal of the first inverter. A second inverter receives an output signal of the boosting circuit, and operates in the second voltage. A switch is connected between the boosting circuit and either the second power supply terminal or the third power supply terminal, and operates to control the operation of the boosting circuit. As a consequence, even when the first voltage is brought into the ground potential, the leak current is prevented.

Also, Japanese Laid Open Patent Application (JP-P2004-128590A) discloses a level shift circuit. In the level shift circuit of this conventional example, an input circuit receives a signal from a low voltage circuit. An output circuit contains a latch circuit, and holds an output signal to a high voltage circuit. A first switch circuit stops the output of the signal from the input circuit to the output circuit in response to a control signal. A second switch circuit stops the supply of power to the output circuit except for the latch circuit in response to a control signal. Thus, the level shift circuit prevents a leak current.

Also, Japanese Patent No. 3498090 discloses a semiconductor device. In this conventional example, an electronic circuit contains a first MOS transistor of a first conductive type having a source-to-drain path between a first potential point and a second potential point, and a source connected to the first potential point. A second MOS transistor of the first conductive type has a source-to-drain path between a third potential point and the first potential point, and a source connected to the third potential point. A control signal is supplied to a gate of the second MOS transistor. When the control signal is set to a first state, the second MOS transistor is set to an ON state, to allow a current to flow between the first potential point and the second potential point via the source-to-drain path of the first MOS transistor in the ON state. When the control signal is set to a second state, the second MOS transistor is set to an OFF state, to restrict a sub-threshold current flowing between the first potential point and the second potential point via the source-to-drain path of the first MOS transistor in the OFF state based upon the characteristic of the OFF state of the second MOS transistor. An operating voltage which is determined based on the third potential point and the second potential point is applied from an internal voltage downing circuit.

SUMMARY OF THE INVENTION

In an aspect of the present invention, a semiconductor device containing a semiconductor chip, includes first and second circuits, a control signal line and a terminal. The first circuit is arranged in a center of the semiconductor chip and is configured to operate in a first voltage. The second circuit is arranged in an input/output circuit area around the first circuit on the semiconductor chip, and is configured to operate in the first voltage and a second voltage and to transfer a signal between an external unit outside the semiconductor chip and the first circuit. The control signal line is provided for the input/output circuit area on the semiconductor chip. The terminal is connected with the control signal line and supplied with a control signal. The second circuit stops a transfer of the signal between the external unit and the first circuit in response to the control signal which is transferred on the control signal line.

In another aspect of the present invention, a semiconductor device containing a semiconductor chip, includes first and second circuits, a control signal line and a voltage detecting circuit. The first circuit is arranged in a center of the semiconductor chip and is configured to operate in a first voltage. The second circuit is arranged in an input/output circuit area around the first circuit on the semiconductor chip, and is configured to operate in the first voltage and a second voltage and to transfer a signal between an external unit outside the semiconductor chip and the first circuit. The control signal line is provided for the input/output circuit area on the semiconductor chip. The voltage detecting circuit is configured to detect whether supply of the first voltage is stopped and to supply a control signal onto the control signal line when the supply of the first voltage is stopped. The second circuit stops a transfer of the signal between the external unit and the first circuit in response to the control signal which is transferred on the control signal line.

Here, the semiconductor device may further include at least one relay buffer provided in a middle portion of the control signal line. In this case, the relay buffer is preferably provided for a corner section of the semiconductor chip.

Also, the second circuit may include at least one of a plurality of input circuits and a plurality of output circuits, provided for a partial peripheral portion around the first circuit. At least one of the plurality of input circuits and the plurality of output circuits may be collectively controlled in response to the control signal. Instead, the second circuit may include at least one of a plurality of input circuits and a plurality of output circuits, provided for a full peripheral portion around the first circuit. At least one of the plurality of input circuits and the plurality of output circuits may be collectively controlled in response to the control signal.

Also, when the second circuit may include at least one of a plurality of input circuits and a plurality of output circuits, provided for a peripheral portion around the first circuit, at least one of the plurality of input circuits and the plurality of output circuits prevents a leak current therein.

Also, in another aspect of the present invention, an electronic apparatus includes a semiconductor device containing a semiconductor chip, and a power control unit arranged outside the semiconductor device and configured to control application of a first voltage to the semiconductor device. The semiconductor device include a first circuit arranged in a center of the semiconductor chip and configured to operate in the first voltage; a second circuit arranged in an input/output circuit area around the first circuit on the semiconductor chip, and configured to operate in the first voltage and a second voltage and to transfer a signal between an external unit outside the semiconductor chip and the first circuit; and a control signal line provided for the input/output circuit area on the semiconductor chip. The second circuit stops a transfer of the signal between the external unit and the first circuit in response to the control signal which is transferred on the control signal line.

Here, the power control circuit may apply the first voltage to the semiconductor device when the semiconductor device needs to operate and stop the supply of the first voltage to the semiconductor device when the semiconductor device needs not to operate. The semiconductor device may further include a detecting circuit configured to detect the application of the first voltage and to output the control signal to the control signal line when the first voltage is not applied. Instead, the power control circuit may supply the control signal to semiconductor device and then stops of the application of the first voltage to the semiconductor device when the semiconductor device needs not to operate and applies the first voltage to the semiconductor device and then stops the supply of the control signal to the semiconductor device when the semiconductor device needs to operate.

BRIEF DESCRIPTION OF THE DRAWINGS

FIG. 3 is a diagram showing a circuit configuration of an electronic apparatus which uses the semiconductor device according to the first embodiment of the present invention;

FIGS. 4A and 4B are timing charts showing an operation of the electronic apparatus which uses the semiconductor device according to the first embodiment;

DESCRIPTION OF THE PREFERRED EMBODIMENTS

Hereinafter, an electronic apparatus using a semiconductor device according to the present invention will be described in detail with reference to the attached drawings. It should be understood that the below mentioned various embodiments of the present invention are merely exemplified, but does not limit the present invention.

First Embodiment

Figure 1:
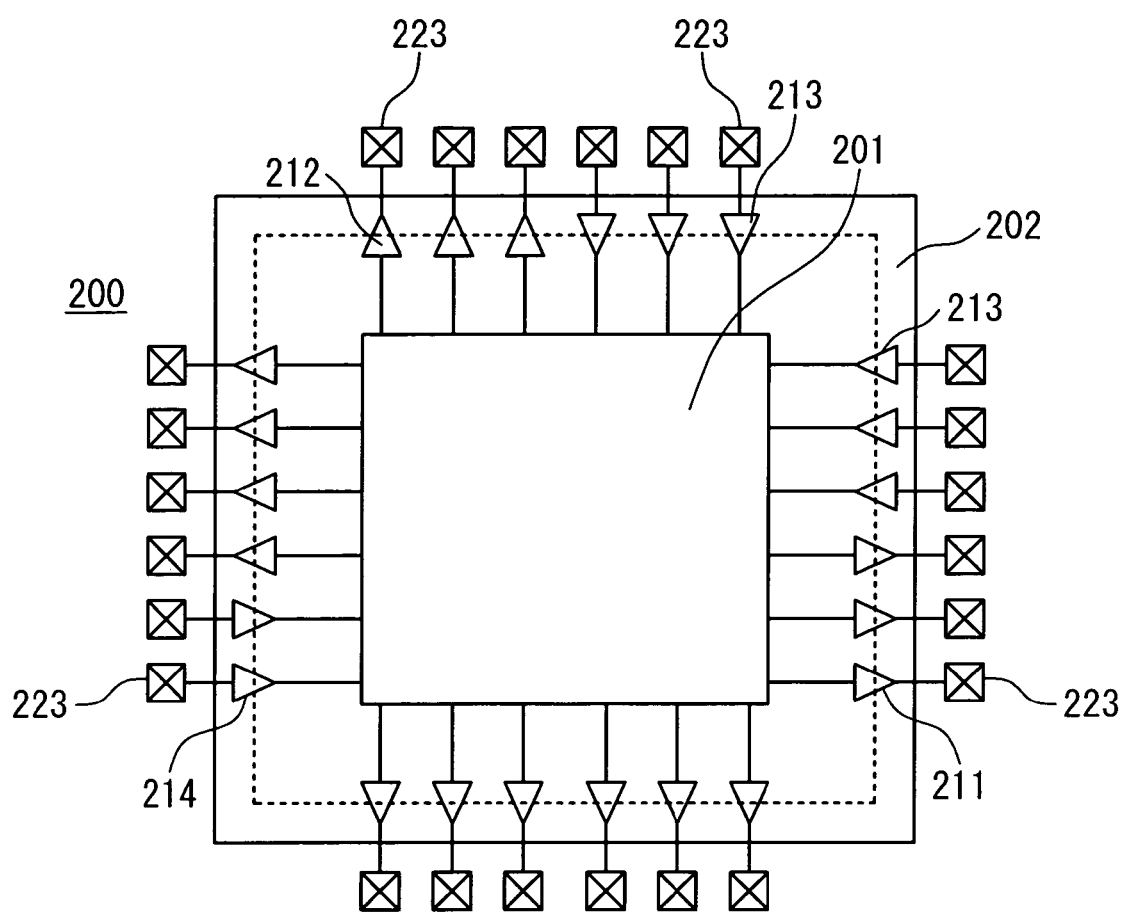
FIG. 1 is a diagram schematically showing a circuit configuration of a conventional semiconductor device.
Figure 2:
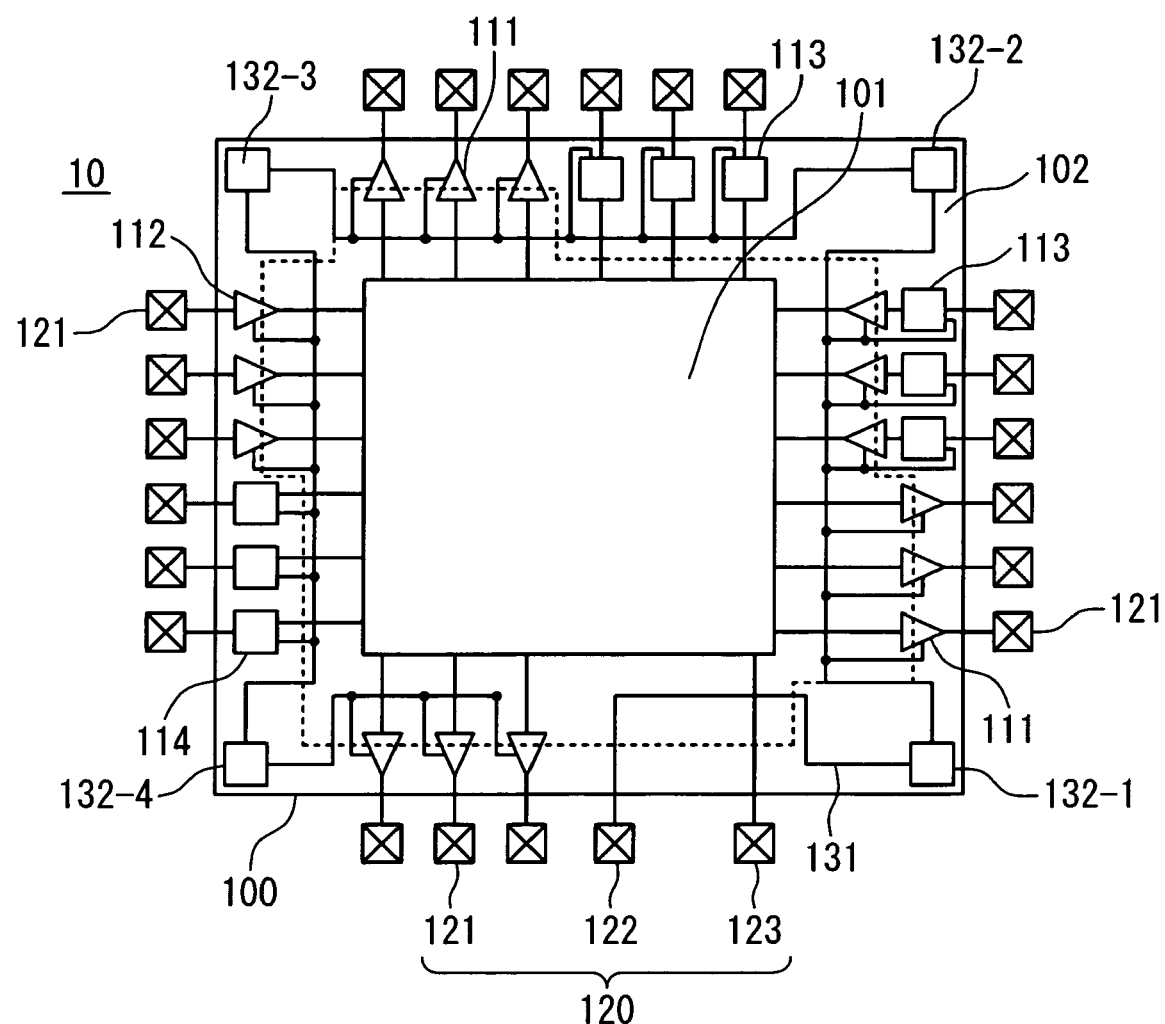
FIG. 2 is a diagram schematically showing a circuit configuration of a semiconductor device according to a first embodiment of the present invention.

FIG. 2 is a diagram schematically showing a circuit configuration of a semiconductor device 10 according to the first embodiment of the present invention. Referring to FIG. 2, the semiconductor device 10 in the first embodiment contains a semiconductor chip 100. Terminals 120 (121, 122 and 123) are provided in a peripheral portion of the semiconductor chip 100. An internal logic circuit 101 is formed in a center portion of the semiconductor chip 100, and an input/output circuit region 102 is formed in an entire peripheral portion outside the internal logic circuit 101. The internal logic circuit 101 operates in a first voltage, for instance, the power supply voltage of 1.2 V. The first voltage is applied from an external circuit (not shown) via the terminal 123 to this internal logic circuit 101. Circuits in the input/output circuit region 102 operate by using the above-mentioned first voltage and a second voltage, for example, the power supply voltage of 3.3 V. It should be noted that sections in an internal region indicated by a dot line in FIG. 2 operate in the first voltage.

A wiring line is formed in the input/output circuit region 102, to transfer the first voltage applied from the terminal 123 to the internal logic circuit 101. Also, level shifters 111 and 112 and gate circuits 113 and 114 are arranged in the input/output circuit region 102. In a case, the level shifter or the gate circuit is independently used for a single signal, and in another case, a series-connected circuit of the level shifter and the gate circuit is used with respect to a single signal, although this is not shown. The first voltage for the internal logic circuit 101 is applied thereto via the terminal 123. A control signal is supplied from an external circuit (not shown) via the terminal 122. A control signal line 131 is extended in the input/output circuit region 102 to transfer the control signal.

When the first voltage is applied to the internal logic circuit 101, the output level shifter 111 level-shifts a signal of the first voltage from the internal logic circuit 101 into a signal of the second voltage, and outputs the level-shifted signal of the second voltage via the terminal 121 to the external circuit. The input level shifter 112 level-shifts a signal of the second voltage applied from the external circuit via the terminal 121 into a signal of the first voltage, and transfers the level-shifted signal of the first voltage to the internal logic circuit 101. Both the output level shifter 111 and the input level shifter 112 stop the level shifting operations when the control signal is supplied. Also, the output level shifter 111 and the input level shifter 112 are configured in such a way that a leak current is prevented within the output/input level shifters 111 and 112.

When the first voltage is applied to the internal logic circuit 101, the gate circuit 113 transfers a signal from the internal logic circuit 101 to the external circuit via the terminal 120. When the first voltage is applied to the internal logic circuit 101, the gate circuit 114 transfers a signal supplied from the external circuit via the terminal 120 to the internal logic circuit 101. The gate circuit 113 stops the operation is when the control signal is supplied to the gate circuit 113. The gate circuit 113 is configured in such a manner that a leak current caused by an uncertain-level signal in the internal logic circuit 101 is prevented within the gate circuit 113. Also, when the control signal is supplied to the gate circuit 114, the gate circuit 114 is configured in such a manner that a leak current caused by a current which passes through a gate of a transistor is prevented within the gate circuit 114.

Four relay buffers 132 (132-1 to 132-4) are provided in four corners of the semiconductor chip 100 on the way of the control-signal line 131 in the input/output circuit region 102. These four relay buffers 132-1 to 132-4 are provided to shape the waveform of the control signal. As a consequence, if the control signal can be transferred without any problem, these relay buffers 132-1 to 132-4 are not always needed. However, generally speaking, these relay buffers 132 are needed, depending upon a size of the semiconductor chip. Also, the reason why the relay buffers 132-1 to 132-4 are provided in the four corners of the semiconductor chip 100 is to effectively utilize the chip area thereof. The control signal is supplied from the control signal input terminal 122, transferred on the control signal line 131 and supplied via the relay buffers 132-1 to 132-4 to the output/input level shifters 111 and 112, and the gate circuits 113 and 114.

It should be noted that in this first embodiment, the control signal line 131 is arranged in the input/output circuit region 102 in such a manner that this control signal line 131 substantially circles to surround the internal logic circuit 101. However, such arrangement is not always needed. It is sufficient that the control signal line 131 is provided in the region where the output/input level shifters 111 and 112 and the gate circuits 113 and 114 are formed.

Next, an electronic apparatus using the semiconductor device 10 according to the first embodiment of the present invention will be described with reference to FIG. 3. As shown in FIG. 3, the electronic apparatus such as a portable telephone and a portable terminal is equipped with a power supply/control unit 11 and the above-described semiconductor device 10. When the power supply/control unit 11 needs to operate the semiconductor device 10, the power supply/control unit 11 applies the power to the semiconductor device 10, and does not output the control signal. On the other hand, when the semiconductor device 10 is not needed to operate, the control signal is outputted to the semiconductor device 10 from the power supply/control unit 11. Then, the power supply/control unit 11 stops application of the power to the semiconductor device 10.

Next, an operation of the electronic apparatus using the semiconductor device 10 according to the first embodiment will now be described. FIGS. 4A and 4B are timing charts showing an operation of the electronic apparatus. In the initial state, the power is applied to the semiconductor device 10.

Now, it is assumed that the semiconductor device 10 needs not be operated. At this time, the power supply/control unit 11 firstly supplies the control signal to the semiconductor device 10. The control signal is supplied to the semiconductor chip 100 via the terminal 122, and is transferred through the control signal line 131. Thus, the control signal is supplied to the output/input level shifters 111 and 112 and the gate circuits 113 and 114. As a result, the operations as to the output/input level shifters 111 and 112 and the gate circuits 113 and 114 are stopped, so that the generation of leak current can be prevented. After a predetermined time period has elapsed from the supply of this control signal, the power supply/control unit 11 stops to supply of the power to the semiconductor device 10. Thus, the operation of the internal logic circuit 101 is stopped.

Thereafter, it is assumed that the semiconductor device 10 needs to be operated. At this time, the power supply/control unit 11 restarts the supply of the power to the semiconductor device 10. After a preset time period has elapsed from the restarting operation of the supply of the power, the power supply/control unit 11 stops to supply the control signal. As a consequence, the semiconductor device 10 can carry out a desirable operation.

In the example shown in FIGS. 4A and 4B, the control signal is in an "L" level when the semiconductor device 100 operates, whereas the control signal is in an "H" level when the supply of the power is stopped. However, it would be apparent to an ordinarily skilled person that the control signal may be in the "H" level when the semiconductor device 100 is operated, whereas the control signal may be in the "L" level when the supply of the power is stopped.

In the above description, when the operation of the semiconductor device 10 is no longer needed, the control signal is firstly outputted and then the supply of the power is stopped. As a result, the prevention of the leak current can be completely realized. However, the supply of the control signal and the stop of the supply of the power may be carried out at the same time. In this case, although a leak current flows more or less, the control operation becomes simple. Also, in the above description, when the operation of the semiconductor device 10 is needed, the supply of the power is firstly restarted, and then the supply of the control signal is stopped. As a result, the prevention of the leak current can be completely realized. However, the stopping operation for the supply of the control signal and the restarting operation for the supply of the power may be carried out at the same time. In this case, although a leak current is more or less generated, the control operation becomes simple.

Second Embodiment

Next, the electronic apparatus using the semiconductor device 10 according to the second embodiment of the present invention will be described.

Figure 5:
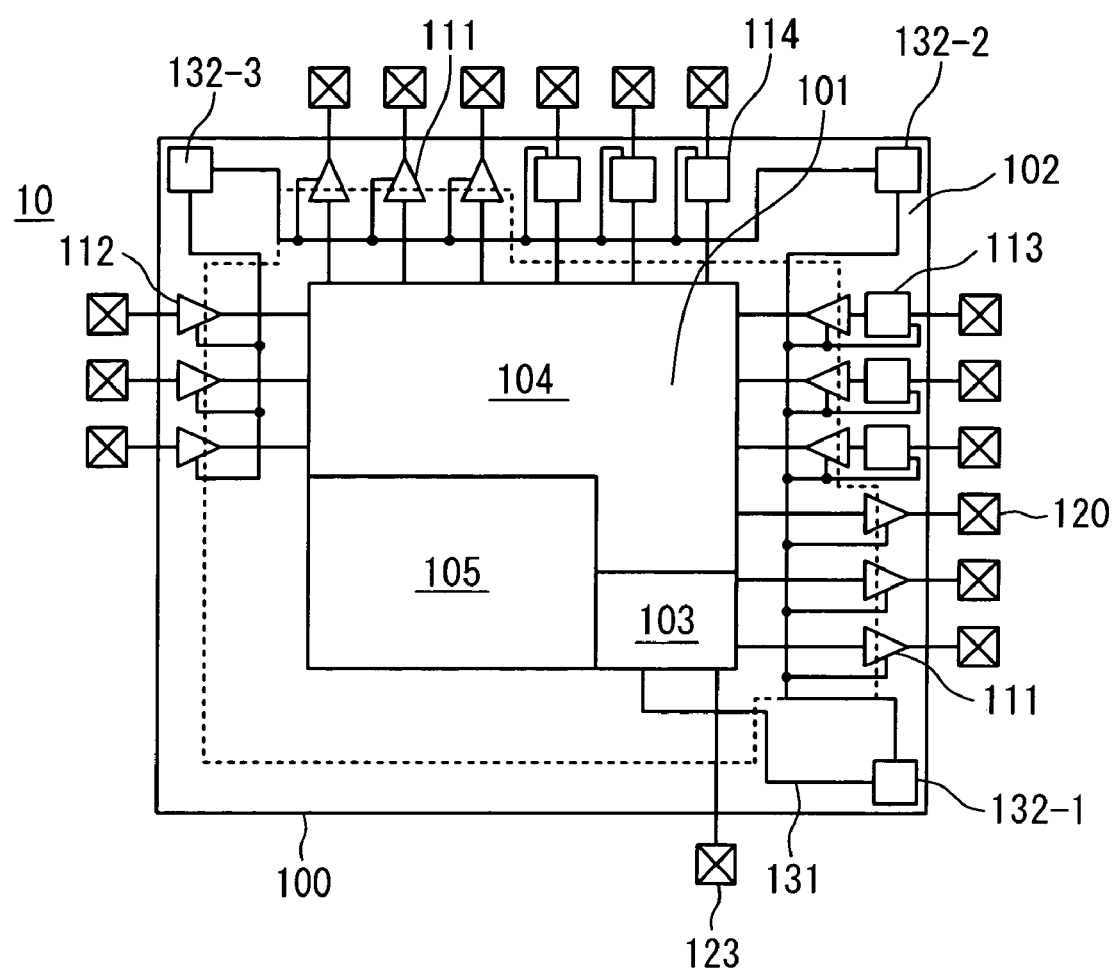
FIG. 5 is a diagram schematically showing a circuit configuration of the semiconductor device according to a second embodiment of the present invention.

FIG. 5 is a block diagram schematically showing a circuit configuration of the semiconductor device 10 according to the second embodiment of the present invention. Referring to FIG. 5, the semiconductor device 10 in the second embodiment contains a semiconductor chip 100. Terminals 120 (123) are provided in the peripheral portion of the semiconductor chip 100. The internal logic circuit 101 is formed in the center portion of the semiconductor chip 100, and the input/output circuit region 102 is formed in a partial peripheral portion outside the internal logic circuit 101. The internal logic circuit 101 is equipped with a detecting circuit 103, a logic circuit block 104, and another logic circuit block 105. The detecting circuit 103 detects supply of power of the first voltage. The logic circuit block 104 operates in the first voltage, as in the first embodiment. The logic circuit block 105 operates by using a voltage other than the applied first voltage. The detection circuit 103 detects the stop of application of the first voltage and outputs a control signal, and also, detects restart of application of the first voltage and stops the output of the control signal. Circuits in the input/output circuit region 102 operate by using both the above-explained first voltage and a second voltage, for example, the power supply voltage of 1.2 V. It should be noted that circuits inside a region indicated by a dot line in FIG. 5 operate in the first voltage. As described above, the internal logic circuit 101 of the semiconductor device 10 in the second embodiment is subdivided into a plurality of blocks, and power supply voltages are independently applied to the respective blocks. Although only a portion related to the circuit block 104 is shown in FIG. 5, a similar circuit to the detection circuit 103 may be provided with respect to the circuit block 105.

A wiring line is formed in the input/output circuit region 102 to transfer the first voltage applied from the terminal 123 via the detection circuit 103 to the logic circuit block 104. Also, output/input level shifters 111 and 112 and gate circuits 113 and 114 are arranged in the input/output circuit region 102. In a case, a level shifter or a gate circuit is independently used with respect to a single signal. In another case, a series-connected circuit of the level shifter and the gate circuit is used with respect to a single signal. The first voltage for the logic circuit block 104 is applied thereto via the terminal 123. A control signal outputted from the detection circuit 103 is transferred on the control signal line 131 in the input/output circuit region 102. It should be noted that the level shifters 111 and 112 and the gate circuits 113 and 114 are similar to those of the above-explained first embodiment. As a consequence, the description of these circuits is omitted.

The control signal line 131 and three relay buffers 132 (132-1 to 132-3) provided at three corners of the semiconductor chip 100 on the way of the control signal line 131 are provided in the input/output circuit region 102. The control signal outputted from the detection circuit 103 is supplied via the control signal line 131 to the level shifter 111, and barrier gate circuits 112 and 113. The relay buffer 132 amplifies the control signal transferred on the control signal line 131 to avoid attenuation of this control signal and deformation of the waveform thereof. As a consequence, when the control signal is transferred without any problem, these relay buffers 132-1 to 132-3 are not always needed. However, generally speaking, the relay buffers 132 are needed depending upon a size of a semiconductor chip. Also, the reason why the relay buffers 132-1 to 132-3 are provided on the three corners of the semiconductor chip 100 is to effectively utilize the chip area thereof. It should be noted that in the second embodiment, the control signal line 131 is provided in a necessary region in the input/output region 102. Therefore, it is sufficient if the control signal line 131 is formed in a region where the level shifter 111 and the barrier gate circuits 112 and 113 are formed.

Figure 6:
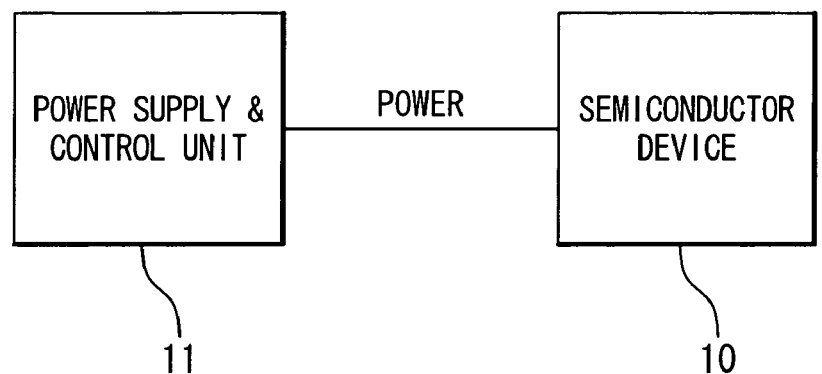
FIG. 6 is a diagram showing a circuit configuration of the electronic apparatus which uses the semiconductor device according to the second embodiment of the present invention.

Next, the electronic apparatus using the semiconductor device 10 according to the second embodiment of the present invention will be described with reference to FIG. 6. As shown in FIG. 6 the electronic apparatus such as a portable telephone and a portable terminal is equipped with a power supply/control unit 11 and the above-described semiconductor device 10. When the power supply/control unit 11 needs to operate the semiconductor device 10, this power supply/control unit 11 applies the power of first voltage to the semiconductor device 10. On the other hand, when the semiconductor device 10 is not needed to operate, the power supply/control unit 10 stops to application of the power of first voltage to the semiconductor device 10.

Figure 7:
FIG. 7 is a diagram showing an operation of the electronic apparatus which uses the semiconductor device according to the second embodiment.

Next, an operation of the semiconductor device 10 according to the second embodiment will now be described. FIG. 7 is a timing chart for showing an operation of the electronic apparatus of FIG. 5. In the initial state, the first voltage is applied to the semiconductor device 10.

Now, it is assumed that the semiconductor device 10 need not be operated. At this time, the power supply/control unit 11 stops to apply the power of first voltage to the semiconductor device 10. When the detection circuit 103 detects the stop of the application of the power of first voltage, the detection circuit 103 outputs the control signal onto the control signal line 131. Then, the control signal is transferred on the control signal line 131, and is supplied to the output/input level shifters 111 and 112 and the gate circuits 113 and 114. As a result, the operations of the output/input level shifters 111 and 112 and the gate circuits 113 and 114 are stopped, so that a leak current can be prevented. Thereafter, it is assumed that the semiconductor device 10 is needed to operate. At this time, the power supply/control unit 11 restarts the application of the power of first voltage to the semiconductor device 10. The detection circuit 103 detects the restarting operation of the application of the first voltage, and the outputting operation of the control signal is stopped. As a consequence, the semiconductor device 10 can carry out the desirable operation.

As described above, in the first embodiment, the control signal line 131 is arranged over the entire region of the input/output circuit region 102. In the second embodiment, however, the control signal line 131 may be provided only in a region corresponding to the relevant circuit block. Also, similar to the first embodiment, the control signal may be supplied from the external circuit, or may be internally generated based on whether or not the power supply voltage is applied, which is realized in the second embodiment.

Since the above-explained structural configuration is employed in the semiconductor device of the present invention, when the supply of the electric power to the internal logic circuit is stopped, the leak current may be suppressed in the elements by a leak preventing mechanism which is arranged in the input/output circuit region, so that the semiconductor device operable in lower power consumption may be realized. As a result, the control signal is applied to the elements, and thus, the elements may be controlled collectively.

Also, since the control signal line for transforming the control signal is provided not in the internal logic circuit, but in the input/output circuit region, the above-described effect can be realized within the smaller device area.

What is claimed is:

1. A semiconductor device containing a semiconductor chip, comprising:
   a first circuit arranged in a center of said semiconductor chip and configured to operate at a first voltage;
   a second circuit arranged in an input/output circuit area around said first circuit on said semiconductor chip, and configured to operate at the first voltage and a second voltage and to transfer a signal between an external unit outside said semiconductor chip and said first circuit;
   a control signal line provided in said input/output circuit area on said semiconductor chip; and
   a terminal connected with said control signal line and supplied with a control signal,
   wherein said second circuit stops a transfer of the signal between the external unit and said first circuit in response to said control signal which is transferred on said control signal line.

2. The semiconductor device according to claim 1, further comprising:
   at least one relay buffer provided in a middle portion of said control signal line.

3. The semiconductor device according to claim 2, wherein said relay buffer is provided in a corner section of said semiconductor chip.

4. The semiconductor device according to claim 1, wherein said second circuit comprises:
   at least one of a plurality of input circuits and a plurality of output circuits, provided in a partial peripheral portion around said first circuit, and
   said at least one of said plurality of input circuits and said plurality of output circuits is collectively controlled in response to said control signal.

5. The semiconductor device according to claim 1, wherein said second circuit comprises:
   at least one of a plurality of input circuits and a plurality of output circuits, provided in a full peripheral portion around said first circuit, and
   said at least one of said plurality of input circuits and said plurality of output circuits is collectively controlled in response to said control signal.

6. The semiconductor device according to claim 1, wherein said second circuit comprises:
   at least one of a plurality of input circuits and a plurality of output circuits, provided in a peripheral portion around said first circuit, and
   said at least one of said plurality of input circuits and said plurality of output circuits prevents a leak current therein.

7. A semiconductor device containing a semiconductor chip, comprising:
   a first circuit arranged in a center of said semiconductor chip and configured to operate at a first voltage;
   a second circuit arranged in an input/output circuit area around said first circuit on said semiconductor chip, and configured to operate at the first voltage and a second voltage and to transfer a signal between an external unit outside said semiconductor chip and said first circuit;
   a control signal line provided in said input/output circuit area on said semiconductor chip; and
   a voltage detecting circuit configured to detect whether supply of said first voltage is stopped and to supply a control signal onto said control signal line when the supply of said first voltage is stopped,
   wherein said second circuit stops a transfer of the signal between the external unit and said first circuit in response to said control signal which is transferred on said control signal line.

8. The semiconductor device according to claim 7, further comprising:
   at least one relay buffer provided in a middle portion of said control signal line.

9. The semiconductor device according to claim 8, wherein said relay buffer is provided in a corner section of said semiconductor chip.

10. The semiconductor device according to claim 7, wherein said second circuit comprises:
    at least one of a plurality of input circuits and a plurality of output circuits, provided in a partial peripheral portion around said first circuit, and
    said at least one of said plurality of input circuits and said plurality of output circuits is collectively controlled in response to said control signal.

11. The semiconductor device according to claim 7, wherein said second circuit comprises:
    at least one of a plurality of input circuits and a plurality of output circuits, provided in a full peripheral portion around said first circuit, and
    said at least one of said plurality of input circuits and said plurality of output circuits is collectively controlled in response to said control signal.

12. The semiconductor device according to claim 7, wherein said second circuit comprises:
    at least one of a plurality of input circuits and a plurality of output circuits, provided in a peripheral portion around said first circuit, and
    said at least one of said plurality of input circuits and said plurality of output circuits prevents a leak current therein.

13. An electronic apparatus comprising:
    a semiconductor device containing a semiconductor chip; and
    a power control unit arranged outside said semiconductor device and configured to control application of a first voltage to said semiconductor device,
    wherein said semiconductor device comprises:
    a first circuit arranged in a center of said semiconductor chip and configured to operate at the first voltage;
    a second circuit arranged in an input/output circuit area around said first circuit on said semiconductor chip, and configured to operate at the first voltage and a second voltage and to transfer a signal between an external unit outside said semiconductor chip and said first circuit; and
    a control signal line provided in said input/output circuit area on said semiconductor chip, and
    said second circuit stops a transfer of the signal between the external unit and said first circuit in response to said control signal which is transferred on said control signal line.

14. The electronic apparatus according to claim 13, wherein said semiconductor device further comprises:

at least one relay buffer provided in a middle portion of said control signal line.

15. The electronic apparatus according to claim 14, wherein said relay buffer is provided in a corner section of said semiconductor chip.

16. The electronic apparatus according to claim 13, wherein said power control circuit applies the first voltage to said semiconductor device when said semiconductor device needs to operate and stops the supply of the first voltage to said semiconductor device when said semiconductor device needs not operate, and said semiconductor device further comprises:
a detecting circuit configured to detect the application of the first voltage and to output said control signal to said control signal line when the first voltage is not applied.

17. The electronic apparatus according to claim 13, wherein said power control circuit supplies said control signal to semiconductor device and then stops of the application of the first voltage to said semiconductor device when said semiconductor device needs not operate and applies the first voltage to said semiconductor device and then stops the supply of said control signal to said semiconductor device when said semiconductor device needs to operate.

18. The electronic apparatus according to claim 13, wherein said second circuit comprises:

at least one of a plurality of input circuits and a plurality of output circuits, provided in a partial peripheral portion around said first circuit, and said at least one of said plurality of input circuits and said plurality of output circuits is collectively controlled in response to said control signal.

19. The electronic apparatus according to claim 13, wherein said second circuit comprises:

at least one of a plurality of input circuits and a plurality of output circuits, provided in a full peripheral portion around said first circuit, and said at least one of said plurality of input circuits and said plurality of output circuits is collectively controlled in response to said control signal.

20. The electronic apparatus according to claim 13, wherein said second circuit comprises:

at least one of a plurality of input circuits and a plurality of output circuits, provided in a peripheral portion around said first circuit, and said at least one of said plurality of input circuits and said plurality of output circuits prevents a leak current therein.

* * * * *